(12) United States Patent
Dahlin et al.

(10) Patent No.: US 7,716,639 B2
(45) Date of Patent: May 11, 2010

(54) SPECIFICATION WIZARD

(75) Inventors: Kenneth Dahlin, Vasteras (SE); Jan Johansson, Ludvika (SE)

(73) Assignee: ABB Technology Ltd. (CH)

( * ) Notice: Subject to any disclaimer, the term of this patent is extended or adjusted under 35 U.S.C. 154(b) by 1181 days.

(21) Appl. No.: 11/304,973

(22) Filed: Dec. 15, 2005

(65) Prior Publication Data
US 2007/0168916 A1 Jul. 19, 2007

(51) Int. Cl.
G06F 9/45 (2006.01)
(52) U.S. Cl. ...................................... 717/121
(58) Field of Classification Search ................ 717/101, 717/121
See application file for complete search history.

(56) References Cited

U.S. PATENT DOCUMENTS

| | | | |
|---|---|---|---|
| 6,343,297 B1 * | 1/2002 | D'Anjou et al. | 707/104.1 |
| 7,137,100 B2 * | 11/2006 | Iborra et al. | 717/106 |
| 7,149,699 B2 * | 12/2006 | Barnard et al. | 705/7 |
| 7,171,652 B2 * | 1/2007 | Motoyama et al. | 717/123 |
| 2004/0111705 A1 * | 6/2004 | Motoyama et al. | 717/126 |
| 2005/0050520 A1 * | 3/2005 | Motoyama et al. | 717/123 |

* cited by examiner

Primary Examiner—John Chavis
(74) Attorney, Agent, or Firm—St. Onge Steward Johnston & Reens LLC

(57) ABSTRACT

A system for facilitating the creation of design specifications includes a computer and a database having stored thereon data indicative of a plurality of storage locations in a processed specification into which data may be entered. Software executing on the computer: displays a requirements document; receives an indication of a selected portion of the requirements document; based at least in part upon the indication of the selected portion of the requirements document, retrieves from the database a list of possible storage locations corresponding to the selected portion of the requirements document; displays the list of possible storage locations corresponding to the selected portion of the requirements document; receives an indication of a selected storage location; receives an indication of data selected in the requirements document to be stored in the selected storage location; and stores the selected data in the selected storage location in the processed specification.

44 Claims, 12 Drawing Sheets

FIG. 5

SPECWIZ AB HALSINGE KRAFT\ZFA 337 C 1396\POS1\ALT1\TEKNISK SPECIFIKATION

File  Document  Help

SEARCH
NETWORK FREQUENCY
| SEARCH PHRASE | SEARCH WORD | SHOW ALL |

NEW GROUP OR ITEM
SPECIAL TESTS
◯ LV DAMP FACTOR, RESONANCE FREQ
GENERAL PARAMETERS \ DESCRIPTION
◉ RATED FREQUENCY [Hz]
PERFORMANCE PARAMETERS \
OVERLOAD REQUIREMENTS
MINIMUM FREQUENCY [Hz]
POWER SUPPLY \ FREQUENCY
FREQUENCY
VOLTAGE SYSTEMS \ SHORT CIRCUIT
NETWORK ZERO SEQ IMP [%]
NETWORK ZERO SEQ IMP [ohm]
Z0/Z1 - RATIO FOR NETWORK

SEARCH

48

9. SPECIFIED DATA — 38

NETWORK FREQUENCY ........................... 50 Hz
NUMBER OF PHASES ............................. 3
ELECTRICAL CONNECTION ....................... YN
NUMBER OF NEUTRAL BUSHINGS .................. 3
RATED POWER ................................. 50 Mvar
RATED VOLTAGE ............................... 130kV
MAXIMUM OPERATING VOLTAGE ................... 143kV
HIGHEST SYSTEM VOLTAGE ...................... 170kV

| | HV-SIDE | NEUTRAL SIDE |
|---|---|---|
| LIGHTING IMPULSE WITHSTAND VOLTAGE | 550 kV | 250kV |
| SWITCHING IMPULSE WITHSTAND VOLTAGE | kV | kV |
| AC WITHSTAND VOLTAGE | 230kV | 95kV |

MAXIMUM AMBIENT TEMPERATURE ................. +45°C
MINIMUM AMBIENT TEMPERATURE ................. -30°C
DAILY AVG AMBIENT TEMPERATURE ............... +30°C
COOLING SYSTEM .............................. ONAN
ALTITUDE ABOVE SEA LEVEL .................... <1000m
MAXIMUM SOUND POWER LEVEL ................... 80 dB

SPECWIZ AB HALSINGE KRAFT\ZFA 337 C 1396\POS1\ALT1\TEKNISK SPECIFIKATION

File  Document  Help

SEARCH | NEW GROUP OR ITEM

NEW GROUP OR ITEM
GROUP NAME: HUMAN REQUIREMENTS
VALUE NAME: UMBRELLA
VALUE: YES        NO. OF VALUE: 1
COMMENT

- [ ] TRANSPORT
- [ ] WINDING
- [ ] COMMERCIAL CONDITIONS
- [x] DELIVERY TRANSPORT
- [ ] DOCUMENTATION
- [ ] ERECTION
- [ ] TESTING

SAVE

NFJRI EROR ROR BOT DP EPE PEOE EOEJKE
NDIEIEN EJEJFIENJEFIE
NMFVIKFIFJ FOFOF FOF FOF NJIENBDU

2. EXTERNAL DESIGN
2.1 MAIN TANK
2.1.1 SEALING
    DNDKSK SNDKF SNDKS SNDKS
2.2 OIL CONSERVATOR
    NDIEJT TRJVNFKG GMFJEOE MFKFEDCLE JDJ
2.3 BUSHINGS
    BDIE WORUG,NB LDPSDO TRERFOFOEDME
2.4 RADIATORS
    NSDJREU KEOEJEOEJ EOEOEJE
2.5 VALVES
    NFJRI EROR ROR BOT DP EPE PEOE EOEJKE
    NDIEIEN EJEJFIENJEFIE
    NMFVIKFIFJ FOFOF FOF FOF NJIENBDU
3 CURRENT TRANSFORMERS
    NDIDID SOSDJE-ERJER 9SPEROF EOEKF

64

SPECWIZ AB HALSINGE KRAFT\ZFA 337 C 1396\POS1\ALT1\TEKNISK SPECIFIKATION

File  Document  Help

☐ BOX  ✗  ✗  ①

SEARCH
TANK VIBRATIONS
*SEARCH PHRASE, SEARCH WORD, SHOW ALL*

NEW GROUP OR ITEM
SPECIAL TESTS
 OVERPRESSURE AND LEAKAGE
 OVERPRESSURE, TANK DEF
 VACUUM, TANK DEF
  VIBRATION
BUSHINGS \ NEUTRAL BUSHINGS
 QUANTITY
GENERAL REQUIREMENTS
 COVER TO TANK GROUNDING
 TANK GROUNDING
TANK
 MANHOLE REQUIREMENTS
 OVERPRESSURE
 OVERPRESSURE [BAR]
 TANK TYPE
 VACUUMPROOF
OIL EXPANSION \ OIL CONSERVATOR

---

4. SUPERVISORY EQUIPMENT
JDUEI RJRJRH EJWW NVKOI DKDODJN

5 CONTROL EQUIPMENT DESIGN 5.1 CONTROL CUBICLE
NDIEJRHRBFBEJ EBEEJ EEKEE EODKLDJD DKDJ
NDID DNDIFNDKS EIDHSD RWNSS SODJ 5.2 APPARATUS STANDARD
DNDKSK SNDKF SNDKS SNDKS
BDHJDJDBD DNDID HRYD LGIR D SUSNC EIDODN 5.3 CABLES
NDIEJT TRJVNFKG GMFJEOE MFKFEDOLE JDJ
NDIFH4 4J4IFJE E ENFDIE WOWEJOJICJ SFJQPO V
HDUJEDUIE DIDNDISD SAIDHWEOFHWOE

6 FACTORY TESTING
BDIE WORUG,NB LDPSD0 TREROFOEDME 6.1 *TANK VIBRATIONS*
NSDJREU KEOEJEOEJ EOEOEJE DHNFIFI9F FIFJFPEIOI
JDISOSOSUEHE9E DHJD8S9 SOS SDUEHW9EH

7 TRANSPORTATION
NFJRI EROR ROR BOT DP EPE PEOE EOEJKE
NDIEIEN EJEJFIENJEFIE
NMFVIKFIFJ FOFOF FOF FOF NJIENBDU

SPECWIZ AB HALSINGE KRAFT\ZFA 337 C 1396\POS1\ALT1\TEKNISK SPECIFIKATION

File  Document  Help

LIST VALUES  3  ▼ ▲   ↶ ↷   ✎   ✏ MARK   ☐ BOX  ✗ ✗ ✗  ⊙

SEARCH | VIBRA(TION)

VIBRATION

SPECIAL TESTS

VIBRATION
YES ▼

COMMENT

IN OPERATION AT RATED VOLTAGE,
RATED FREQUENCY AND NORMAL
OPERATING TEMPERATURE THE
VIBRATION AMPLITUDE SHALL NOT IN
ANY LOCATION EXCEED 100 PM PEAK-
TO-PEAK VALUE.

SAVE

{ 82 }

— 36

4. SUPERVISORY EQUIPMENT
   JDIJEI RJRJRH  EJWW NVKDI DKDDJN

5 CONTROL EQUIPMENT DESIGN 5.1 CONTROL CUBICLE
   NDIEJRHRBFBEJ EBEEJ EEKEE EODKIDJD DKDJ
   NDID DNDIFNDKS EIDHSD RIVNSS SODJS 5.2 APPARATUS STANDARD
   DNDKSK  SNDKF SNDKS SNDKS
   BDHJDJDBD DNDID HRYD LGIR D SUSNC EIDODN 5.3 CABLES
   NDIEJT TRJVNFKG GMFJEOE MFKFEDOLE JDJ
   NDIFH4 4J4IFJE E ENFDIE WOWEJOJIOJ SFJOPO V
   HDIJEDIJE  DIDNDISD SAIDHWEOFHWOE

6 FACTORY TESTING
   BDIE WORUG,NB LDPSD0 TREROFOEDME 6.1 TANK VIBRATIONS — 38'
   NSDJREJJKFOEJEDEJ FODEOEJE DHJNFJFJBF FIHJFFJEJOJ
   JDJSOJSOJSJEHEJE OJ4JD9ISJ SJOJS JEDJSJFHW9EJ1

7 TRANSPORTATION
   NFJRI EROR ROR BOT DP EPE PEOE EOEJKE
   NDIEIEN EJEJFIENJEFIE
   NMFVJKFIFJ FOFOF FOF NJIENBDJ

9. SPECIFIED DATA

NETWORK FREQUENCY — 50 Hz
NUMBER OF PHASES — 3
ELECTRICAL CONNECTION — YN
NUMBER OF NEUTRAL BUSHINGS — 3
RATED POWER — 50 Mvar
RATED VOLTAGE — 130kV
MAXIMUM OPERATING VOLTAGE — 143kV
HIGHEST SYSTEM VOLTAGE — 170kV

| | HV-SIDE | NEUTRAL SIDE |
|---|---|---|
| LIGHTING IMPULSE WITHSTAND VOLTAGE | 550 kV | 250kV |
| SWITCHING IMPULSE WITHSTAND VOLTAGE | | kV |
| AC WITHSTAND VOLTAGE | 230kV | 95kV |

MAXIMUM AMBIENT TEMPERATURE — +45°C
MINIMUM AMBIENT TEMPERATURE — −30°C
DAILY AVG AMBIENT TEMPERATURE — +30°C
COOLING SYSTEM — ONAN
ALTITUDE ABOVE SEA LEVEL — <1000m
MAXIMUM SOUND POWER LEVEL — 80 dB

---

REOPT-REACTOR OPTIMIZATION

RUN OPTIONS | MAIN DATA | CORE & WINDING | INSUL/DIMEN | LIMITS

VOLTAGE SYSTEM

RATED POWER [Mvar] 50.0
SYST. VOLTAGE [kv] 130.00
MAX OPER. VOLT. [kV]-Umax 143.00
FREQUENCY [H₁] 50.00
CONNNECTION Y

INSULATION

AC INSULATION LEVEL PHASE [kV] 230.0
AC INSULATION LEVEL NEUTRAL [kV] 95.0
FULL WAVE PHASE [kV] 550.
FULL WAVE NEUT. [kV] 250.
SWITCH IMPULSE [kV] 0.
P.D.TEST AT [PU] 0.0 kUmax

COOLING

COOLING TYPE ONAN
WINDING TEMP RISE 65
TOP OIL TEMP RISE 60
RADIATOR LOCATION
FAN SPEED 0
TANK SIDES WITH RADIANCE

LOSS TEMP 85 °C
NO OF GROUPS/LIMB 2
WINDING CENTER ENTRY

TEST NUMBER 1
250.0 kV
250.0 kV  550.0 kV  250.0 kV
550.0 kV   A
250.0 kV  550.0 kV  250.0 kV
250.0 kV

WINDING-TANKSIDE LIMB 550.0
TEST TYPE IMPULSE

ADD  DELETE

CALULATE | SAVE | SAVE DATA | REFRESH | PRINT RESULTS
NONE DEFINED | NETWORK FREQUENCY | ☐ AUTOREFRESH

SPECIFICATION WIZARD

FIELD OF THE INVENTION

The present invention relates to a computer implemented system and method for reading printed customer specification documents and visibly and logically linking information directly from the printed customer specification documents to digital design specifications for use as input data in design programs.

BACKGROUND OF THE INVENTION

There are many industries in which manufacturers of various products and components are required to design and create such products and components to meet customer specifications. These customer specifications, which are typically provided to the manufacturers as requirements documents in printed format, are then often converted by the manufacturer into digital design specifications, which are used as input data in design programs. These design programs use the input data contained in the digital design specifications to create plans for the physical products and/or components embodying the requirements documents.

Traditionally, the process of converting the requirements documents into digital design specifications was performed manually by a person, or more typically, by a team of people, who would read the requirements document, extract the pertinent information therefrom, and then enter this pertinent information into corresponding fields in the digital design specification. However, this is very often a cumbersome process. The requirements documents can be very lengthy; for cumbersome process. The requirements documents can be very lengthy; for example, for an electrical transformer, the requirements document may comprise one or more documents that can contain hundreds of pages. Moreover, the number of errors involved with the traditional process can be substantial, particularly when several different persons read and convert several different portions of the requirements document. Efforts have been made to reduce the number of errors, such as by providing checklists which may be used to verify that all necessary requirements have been found in the requirements document and entered into the digital design specification.

However, even when checklists are employed, the traditional processes for converting requirements documents into digital design specifications which may be used as input for design programs suffer from many disadvantages. For example, there is no way using traditional processes to verify where in the requirements document a requirement was read and how it was interpreted. Therefore, if a question arises concerning the origin of a piece of information, it may be difficult and time consuming to locate the origin in the hundreds of pages of the requirements document. In addition, using traditional processes, it may be unclear to the reader where in a checklist or in a digital design specification a requirement found in the requirements document should be entered. When customers prepare their requirements documents, they do not always follow a similar format, and they do not always use the exact same terminology in describing their requirements, thereby exacerbating this problem.

Moreover, data from the requirements document may be transcribed several times from the requirements document to one or more checklists and then to the digital design specification, with the consequent possibility that the data may be misinterpreted in the process. Furthermore, there is no way to verify what sections of the requirements document have been read, particularly when several different people are reading different portions thereof. Consequently, sections of the requirements document may be omitted, or they may be read by several persons. In addition, requirements that are not part of the checklists may be missed, as there is no defined process to ensure that they are documented. Further, it is difficult to obtain an overview of which requirements in the requirements document have been captured, and which parts still need to be captured. Moreover, if there are common portions of a requirements document that are used for several sections of the digital design specification, such common portions may disadvantageously re-read numerous times for each new section of the digital design specification, thereby causing unnecessary duplication of effort.

What is desired, therefore, is a system and method for facilitating the creation, based on requirements documents, of design specifications that may be used as input data in design programs, which is streamlined and efficient from a time standpoint, which is accurate and not prone to errors, which allows for the verification of where in the requirements document a requirement was read and how it was interpreted, which facilitates entry of requirements found in the requirements document into the design specifications, which reduces the likelihood of duplication of effort, and which facilitates the determination of what sections of the requirements documents have been read and what sections still need to be read.

SUMMARY OF THE INVENTION

Accordingly, it is an object of the present invention to provide a system and method for facilitating the creation, based on requirements documents, of design specifications that may be used as input data in design programs.

Another object of the present invention is to provide a system and method having the above characteristics and which is streamlined and efficient from a time standpoint.

A further object of the present invention is to provide a system and method having the above characteristics and which is accurate and not prone to errors.

Still another object of the present invention is to provide a system and method having the above characteristics and which allows for the verification of where in the requirements document a requirement was read and how it was interpreted.

Yet a further object of the present invention is to provide a system and method having the above characteristics and which facilitates entry of requirements found in the requirements document into the design specifications.

Still a further object of the present invention is to provide a system and method having the above characteristics and which reduces the likelihood of duplication of effort.

Yet another object of the present invention is to provide a system and method having the above characteristics and which facilitates the determination of what sections of the requirements documents have been read and what sections still need to be read.

These and other objects of the present invention are achieved in accordance with one embodiment of the present invention by provision of a system for facilitating the creation of design specifications, the system including a specification creation computer. Software executing on the specification creation computer displays to a user a requirements document, and receives an indication from the user of a selected portion of the requirements document. The system also includes a storage locations database having stored thereon data indicative of a plurality of storage locations in a processed specification into which data may be entered. Software executing on the specification creation computer, based at least in part upon the indication from the user of the selected portion of the requirements document, retrieves from the storage locations database a list of possible storage locations corresponding to the selected portion of the requirements document. Software executing on the specification creation computer displays to the user the list of possible storage locations corresponding to the selected portion of the requirements document, and receives an indication from the user of a selected storage location. Software executing on the specification creation computer receives an indication from the user of data selected by the user in the requirements document to be stored in the selected storage location, and stores the selected data in the selected storage location in the processed specification.

In some embodiments, the requirements document is stored on and retrieved from a requirements document database. In some embodiments, the system further includes a requirements document capture computer/device for converting a requirements document from a printed document to a digital format. In some embodiments, the software executing on the specification creation computer which receives an indication from a user of a selected portion of the requirements document further comprises software executing on the specification creation computer which displays the requirements document to the user with the selected portion shown in a manner visually distinctive from unselected portions of the displayed requirements document. In some embodiments, the requirements document is stored on and retrieved from a requirements document database, and the software executing on the specification creation computer which receives an indication from a user of a selected portion of the requirements document further comprises software executing on the specification creation computer which updates the requirements document stored on the requirements document database to reflect the portion of the requirements document selected by the user.

In some embodiments, the system further includes software executing on the specification creation computer which, before the list of possible storage locations corresponding to the selected portion of the requirements document is retrieved from the storage locations database, interprets the selected portion of the requirements document using optical character recognition. In some embodiments, the software executing on the specification creation computer which receives an indication from the user of a selected storage location comprises software executing on the specification creation computer which, if a desired storage location is in the list displayed to the user, receives an indication from the user of a selected storage location selected from the list, and if a desired storage location is not in the list displayed to the user, receives an indication from the user of a selected storage location input by the user. In some embodiments, the software executing on the specification creation computer which receives an indication from the user of data selected by the user in the requirements document desired to be stored in the selected storage location further comprises software executing on the specification creation computer which displays the requirements document to the user with the selected data shown in a manner visually distinctive from unselected portions of the displayed requirements document.

In some embodiments, the requirements document is stored on and retrieved from a requirements document database, and the software executing on the specification creation computer which receives an indication from the user of data selected by the user in the requirements document desired to be stored in the selected storage location further comprises software executing on the specification creation computer which updates the requirements document stored on the requirements document database to reflect data selected by the user in the requirements document desired to be stored in the selected storage location. In some embodiments, the software executing on the specification creation computer which receives an indication from the user of data selected by the user in the requirements document desired to be stored in the selected storage location further comprises software executing on the specification creation computer which determines whether data has previously been stored in the selected storage location, and, if data has been previously stored in the selected storage location, displays a warning to the user indicating a potential conflict and receives an indication from the user whether to use the previously entered data or the currently entered data. In some embodiments, the processed specification is stored on a processed specifications database. In some embodiments, the system further includes software executing on the specification creation computer which, before the selected data is stored in the selected storage location in the processed specification, interprets the data selected by the user in the requirements document using optical character recognition.

In some embodiments, the system further includes software executing on the specification creation computer which receives an indication from the user of a portion of the requirements document desired to be linked to the data selected by the user in the requirements document, and which stores, in the processed specification, a link to the portion of the requirements document desired to be linked. In certain of these embodiments, the software executing on the specification creation computer which receives an indication from the user of a portion of the requirements document desired to be linked to the data selected by the user in the requirements document further comprises software executing on the specification creation computer which displays the requirements document to the user with the portion of the requirements document desired to be linked shown in a manner visually distinctive from unlinked portions of the displayed requirements document. In some embodiments, the specification creation computer comprises a plurality of specification creation computers, and the plurality of specification creation computers are capable of being used by a plurality of users simultaneously in order to simultaneously process the requirements document into the processed specification. In some embodiments, the system further includes a designer computer having software executing thereon for creating a design specification based at least in part upon the processed specification. In certain of these embodiments, the specification creation computer and the designer computer comprise the same computer system.

In accordance with another embodiment of the present invention, a system for facilitating the creation of design specifications includes a specification creation computer. Software executing on the specification creation computer displays to a user a requirements document, receives an indication from the user of a selected portion of the requirements document, and displays the requirements document to the user with the selected portion shown in a manner visually distinctive from unselected portions of the displayed requirements document. Software executing on the specification creation computer interprets the selected portion of the requirements document using optical character recognition. A storage locations database has stored thereon data indicative of a plurality of storage locations in a processed specification into which data may be entered. Software executing on the specification creation computer, based at least in part upon the indication from the user of the selected portion of the requirements document, retrieves from the storage locations database a list of possible storage locations corresponding to the selected portion of the requirements document, and displays to the user the list of possible storage locations corresponding to the selected portion of the requirements document. Software executing on the specification creation computer, if a desired storage location is in the list displayed to the user, receives an indication from the user of a selected storage location selected from the list, and if a desired storage location is not in the list displayed to the user, receives an indication from the user of a selected storage location input by the user. Software executing on the specification creation computer which an indication from the user of data selected by the user in the requirements document to be stored in the selected storage location, and displays the requirements document to the user with the selected data shown in a manner visually distinctive from unselected portions of the displayed requirements document. Software executing on the specification creation computer interprets the data selected by the user in the requirements document using optical character recognition, and determines whether data has previously been stored in the selected storage location. If data has been previously stored in the selected storage location, software executing on the specification creation computer displays a warning to the user indicating a potential conflict and receives an indication from the user whether to use the previously entered data or the currently entered data, and stores the selected data in the selected storage location in the processed specification if the indication is indicative of a desire to use the currently entered data.

In some embodiments, the requirements document is stored on and retrieved from a requirements document database. In certain of these embodiments, the system further includes a requirements document capture computer/device for converting a requirements document from a printed document to a digital format and for storing the requirements document, in the digital format, on the requirements document database. In certain embodiments, the software executing on the specification creation computer which receives an indication from a user of a selected portion of the requirements document further comprises software executing on the specification creation computer which updates the requirements document stored on the requirements document database to reflect the portion of the requirements document selected by the user. In certain embodiments, the software executing on the specification creation computer which receives an indication from the user of data selected by the user in the requirements document desired to be stored in the selected storage location further comprises software executing on the specification creation computer which updates the requirements document stored on the requirements document database to reflect data selected by the user in the requirements document desired to be stored in the selected storage location.

In some embodiments, the processed specification is stored on a processed specifications database. In some embodiments, the system further includes software executing on the specification creation computer which receives an indication from the user of a portion of the requirements document desired to be linked to the data selected by the user in the requirements document, and which stores, in the processed specification, a link to the portion of the requirements document desired to be linked. In certain of these embodiments, the software executing on the specification creation computer which receives an indication from the user of a portion of the requirements document desired to be linked to the data selected by the user in the requirements document further comprises software executing on the specification creation computer which displays the requirements document to the user with the portion of the requirements document desired to be linked shown in a manner visually distinctive from unlinked portions of the displayed requirements document. In some embodiments, the specification creation computer comprises a plurality of specification creation computers, and the plurality of specification creation computers are capable of being used by a plurality of users simultaneously in order to simultaneously process the requirements document into the processed specification. In some embodiments, the system further includes a designer computer having software executing thereon for creating a design specification based at least in part upon the processed specification. In certain of these embodiments, the specification creation computer and the designer computer comprise the same computer system.

In accordance with another aspect of the present invention, a method for facilitating the creation of design specifications includes the steps of: (i) displaying to a user a requirements document; (ii) receiving an indication from the user of a selected portion of the requirements document; (iii) retrieving from a storage locations database having stored thereon data indicative of a plurality of storage locations in a processed specification into which data may be entered, based at least in part upon the indication from the user of the selected portion of the requirements document, a list of possible storage locations corresponding to the selected portion of the requirements document; (iv) displaying to the user the list of possible storage locations corresponding to the selected portion of the requirements document; (v) receiving an indication from the user of a selected storage location; (vi) receiving an indication from the user of data selected by the user in the requirements document to be stored in the selected storage location; and (vii) storing the selected data in the selected storage location in the processed specification.

In some embodiments, the method further includes the step of, before the step of displaying to a user a requirements document, storing the requirements document on and retrieving the requirements document from a requirements document database. In some embodiments, the method further includes the step of converting a requirements document from a printed document to a digital format. In some embodiments, the step of receiving an indication from a user of a selected portion of the requirements document further comprises the step of displaying the requirements document to the user with the selected portion shown in a manner visually distinctive from unselected portions of the displayed requirements document. In certain embodiments, the step of receiving an indication from a user of a selected portion of the requirements document further comprises the step of updating the requirements document stored on the requirements document database to reflect the portion of the requirements document selected by the user.

In some embodiments, the method further includes the step of, before the list of possible storage locations corresponding to the selected portion of the requirements document is retrieved from the storage locations database, interpreting the selected portion of the requirements document using optical character recognition. In some embodiments, the step of retrieving a list of possible storage locations comprises the step of, if a desired storage location is in the list displayed to the user, receiving an indication from the user of a selected storage location selected from the list, and if a desired storage location is not in the list displayed to the user, receiving an indication from the user of a selected storage location input by the user. In some embodiments, the step of receiving an indication from the user of data selected by the user in the requirements document desired to be stored in the selected storage location further comprises the step of displaying the requirements document to the user with the selected data shown in a manner visually distinctive from unselected portions of the displayed requirements document. In certain embodiments, the step of receiving an indication from the user of data selected by the user in the requirements document desired to be stored in the selected storage location further comprises the step of updating the requirements document stored on the requirements document database to reflect data selected by the user in the requirements document desired to be stored in the selected storage location.

In some embodiments, the step of receiving an indication from the user of data selected by the user in the requirements document desired to be stored in the selected storage location further comprises the step of determining whether data has previously been stored in the selected storage location, and, if data has been previously stored in the selected storage location, displaying a warning to the user indicating a potential conflict and receiving an indication from the user whether to use the previously entered data or the currently entered data. In some embodiments, the processed specification is stored on a processed specifications database. In some embodiments, the method further includes the step of, before the selected data is stored in the selected storage location in the processed specification, interpreting the data selected by the user in the requirements document using optical character recognition.

In some embodiments, the method further includes the step of receiving an indication from the user of a portion of the requirements document desired to be linked to the data selected by the user in the requirements document, and storing, in the processed specification, a link to the portion of the requirements document desired to be linked. In certain of these embodiments, the step of receiving an indication from the user of a portion of the requirements document desired to be linked to the data selected by the user in the requirements document further comprises the step of displaying the requirements document to the user with the portion of the requirements document desired to be linked shown in a manner visually distinctive from unlinked portions of the displayed requirements document. In some embodiments, the requirements document is capable of being processed into the processed specification by a plurality of users simultaneously. In some embodiments, the method further includes the step of creating a design specification based at least in part upon the processed specification.

The invention and its particular features and advantages will become more apparent from the following detailed description considered with reference to the accompanying drawings.

BRIEF DESCRIPTION OF THE DRAWINGS

FIGS. 5 through 12 are screen shots illustrating exemplary screen displays which a user may encounter during operation of the system for facilitating the creation of design specifications shown in FIG. 1.

DETAILED DESCRIPTION OF AN EMBODIMENT OF THE INVENTION

Figure 1:
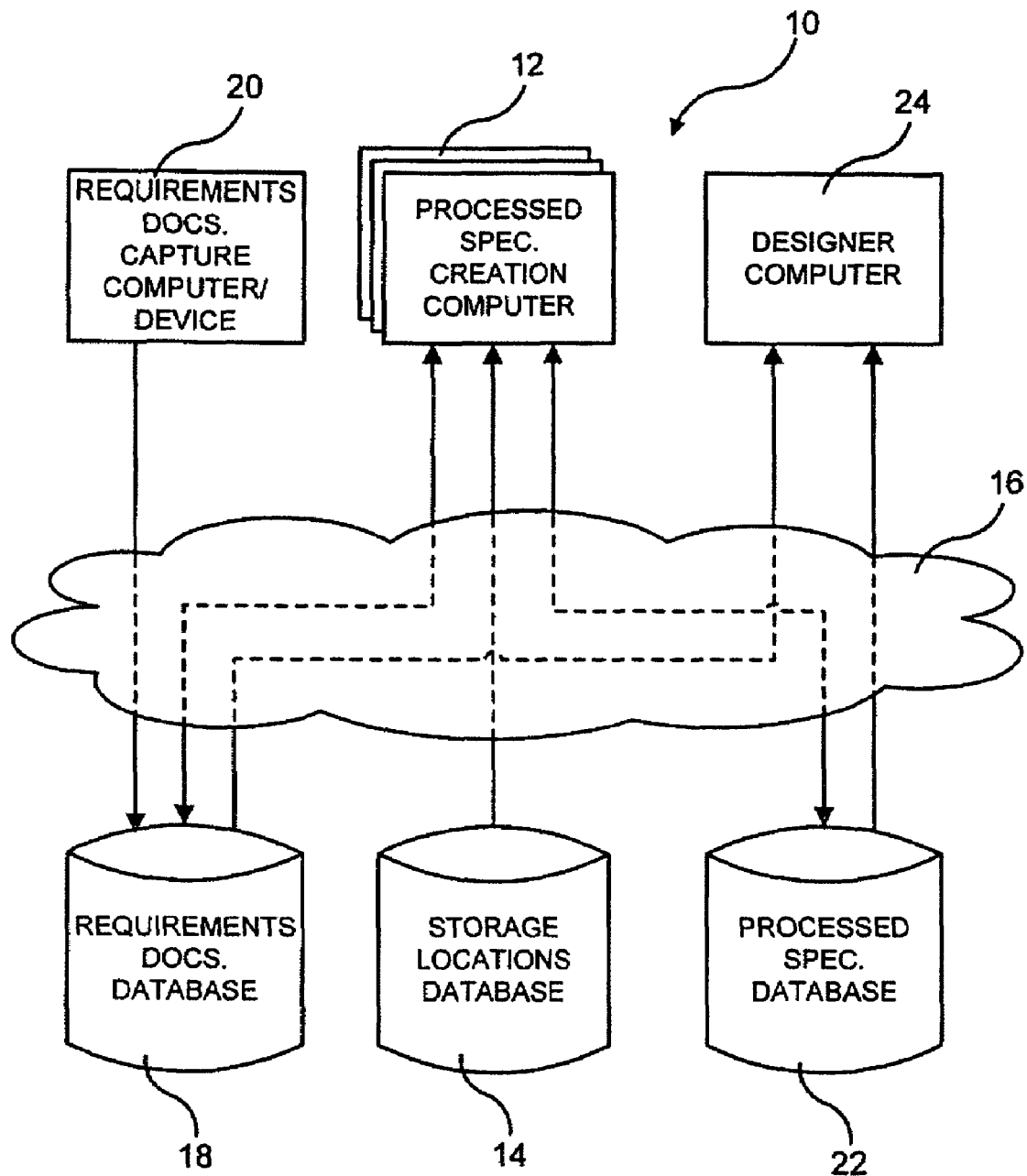
FIG. 1 is a schematic illustration of an embodiment of a system for facilitating the creation of design specifications in accordance with the present invention.

Referring first to FIG. 1, a system 10 for facilitating the creation of design specifications in accordance with the present invention is shown. System 10 includes at least one processed specification creation computer 12 utilized by the users of system 10 to process one or more user requirements documents into processed design specifications. A plurality of processed specification creation computers 12 may be provided for allowing multiple users to work simultaneously to process the user requirements documents into processed design specifications. While the specification creation computer 12 may be a desktop computing system, it should be understood that laptop systems, client-server systems, terminals, hand-held computing devices, such as a personal digital assistants, hand-held personal computers, or other types of computing systems may be used.

Processed specification creation computer 12 is in communication with a storage locations database 14 via a communications network 16, which may be any type of network, such as the Internet, a satellite communications network, a wireless or wired telecommunications network, a local area network (LAN), a wide area network (WAN), a virtual private network (VPN), a direct wired connection, or any combination thereof. Storage locations database 14 has stored thereon data indicative of a plurality of storage locations in the processed specification into which data may be entered. These storage locations correspond to data fields which are pertinent for configuration of the product or component being designed, and which are employed by design software for that purpose (as explained more fully below).

Processed specification creation computer 12 is also in communication with, via network 16, a requirements documents database 18 on which is stored one or more requirements documents supplied by a customer. The requirements documents stored on requirements documents database 18 may be in substantially any digital format, such as portable document format (PDF), tagged image file format (TIFF), Word format (DOC), text format (TXT), or any of numerous other formats. The requirements documents may be supplied by the customer in a digital format, in which case, they are simply saved onto requirements documents database 18. Alternately, the requirements documents may be supplied by the customer in printed format, and converted to digital format by a requirements document capture computer/device 20 which is in communication with requirements documents database 18. Requirements document capture computer/device 20 may, for example, take the form of a scanner, a copier with scanning capabilities, or any other device capable of converting a printed document into a digital document. Processed specification creation computer 12 is also in communication with requirements documents database 18 so that it can retrieve and modify the requirements documents stored thereon, as discussed more fully below.

System 10 also includes a processed specification database 22 with which processed specification creation computer 12 is in communication. Processed specification database 22 has stored thereon processed design specifications, which contain information, extracted from the customer requirements documents, pertinent for configuration of the product or component being designed. The processed design specifications are in a digital format readable by design software executing on a designer computer 24 which is in communication with processed specifications database 22. Users of designer computer 24 operate the design program executing thereon to create plans for the physical products and/or components embodying the requirements documents based upon the input data contained in the processed design specifications.

While processed specification creation computer 12, requirements document capture computer/device 20 and designer computer 24 are described and shown as comprising three separate computing devices, it should be understood that such is not required, and that any two, or even all three, may be combined. Similarly, while storage locations database 14, requirements documents database 18 and processed specifications database 22 are described and shown as comprising three separate databases, it should be understood that such is not required, and that any two, or even all three, may be combined.

Figure 2:
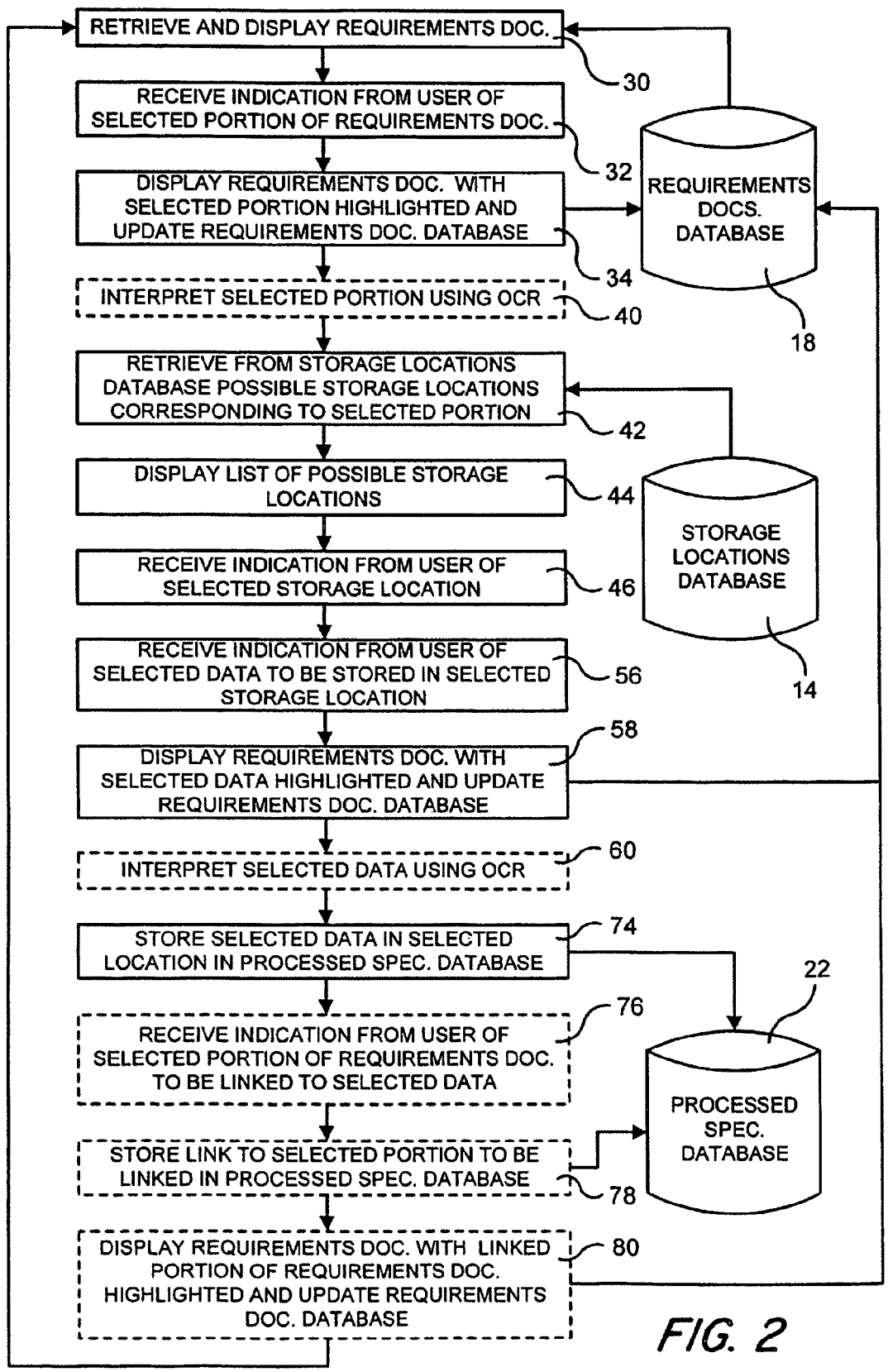
FIG. 2 is a flow diagram illustrating the method of operation of the system for facilitating the creation of design specifications shown in FIG. 1.

With reference now to FIG. 2 in addition to FIG. 1, software executing on processed specification creation computer 12 retrieves from requirements documents database 18, and displays to a user, a requirements document (as shown at block 30). As discussed above, the requirements documents may be supplied by the customer in a digital format, in which case, they are simply saved onto requirements documents database 18, or they may be supplied by the customer in printed format, and converted to digital format by a requirements document capture computer/device 20 which is in communication with requirements documents database 18.

At block 32, the software receives an indication from the user of a selected portion of the requirements document, and then at block 34, the software displays the requirements document to the user with the selected portion shown in a manner visually distinctive from unselected portions of the displayed requirements document, and updates the requirements document stored on the requirements document database 14 to reflect the portion of the requirements document selected by the user. FIG. 5 illustrates a screenshot showing a requirements document 36 being displayed with a selected portion 38 shown in a manner visually distinctive from unselected portions.

Selection of portions of the requirements document may be accomplished in any of a number of ways. For example, by double clicking an input device with a selection tool positioned over a word, the selection tool may be used to identify the border of the word and mark the word as being selected, by moving the input device along a row, the selection tool may be used to identify the border of the section of the line and mark this section as being selected, by moving the selection tool over several rows, the tool may identify each row as being selected (the first line being marked from where the operation started and the last line up to the point where the operation was finished, including intermediate lines), by using a selection tool to make a freehand box, sections located within the box may be marked as selected, etc. The input device used to move the selection tool may be a mouse, a touchpad, or any similar input device, as is known in the art. If desired, the marked section may be unmarked by clicking the input device with the selection tool positioned in a marked section. Selected portions of the requirements document may be shown in a manner visually distinctive from unselected portions, for example, by surrounding the selected portions with a coloured transparent rectangle (similar to the way text may be highlighted using a marker), by displaying selected portions in a bolded, italicized, underlined, or otherwise visually distinctive font as compared to unselected portions, by displaying selected portions in a different colour than unselected portions, etc.

If the requirements document is not in a text based format, such as if it is in portable document format (PDF) format, the software interprets the selected portion of the requirements document using optical character recognition or like technology so that the selected portion is converted into text format, as shown at 40. The software, based at least in part upon the indication from the user of the selected portion of the requirements document, retrieves from storage locations database 14 a list of possible storage locations corresponding to the selected portion of the requirements document, as shown at block 42, and displays to the user the list of possible storage locations corresponding to the selected portion of the requirements document, as shown at block 44. The list may be generated, for example, by searching storage locations database 14 and listing all items that contain the keyword or keywords contained in the portion of the requirements document selected by the user. The list may remain hidden, popping up when the user has to make a selection. The list may be sorted based on the user's hit-rate for the keyword or keywords in order to facilitate selection therefrom. The software then, as shown at block 46, receives an indication from the user of a selected storage location. A list 48 of possible storage locations corresponding to a selected portion 38 of a requirements document 36 is illustrated in FIG. 5.

Figure 3:
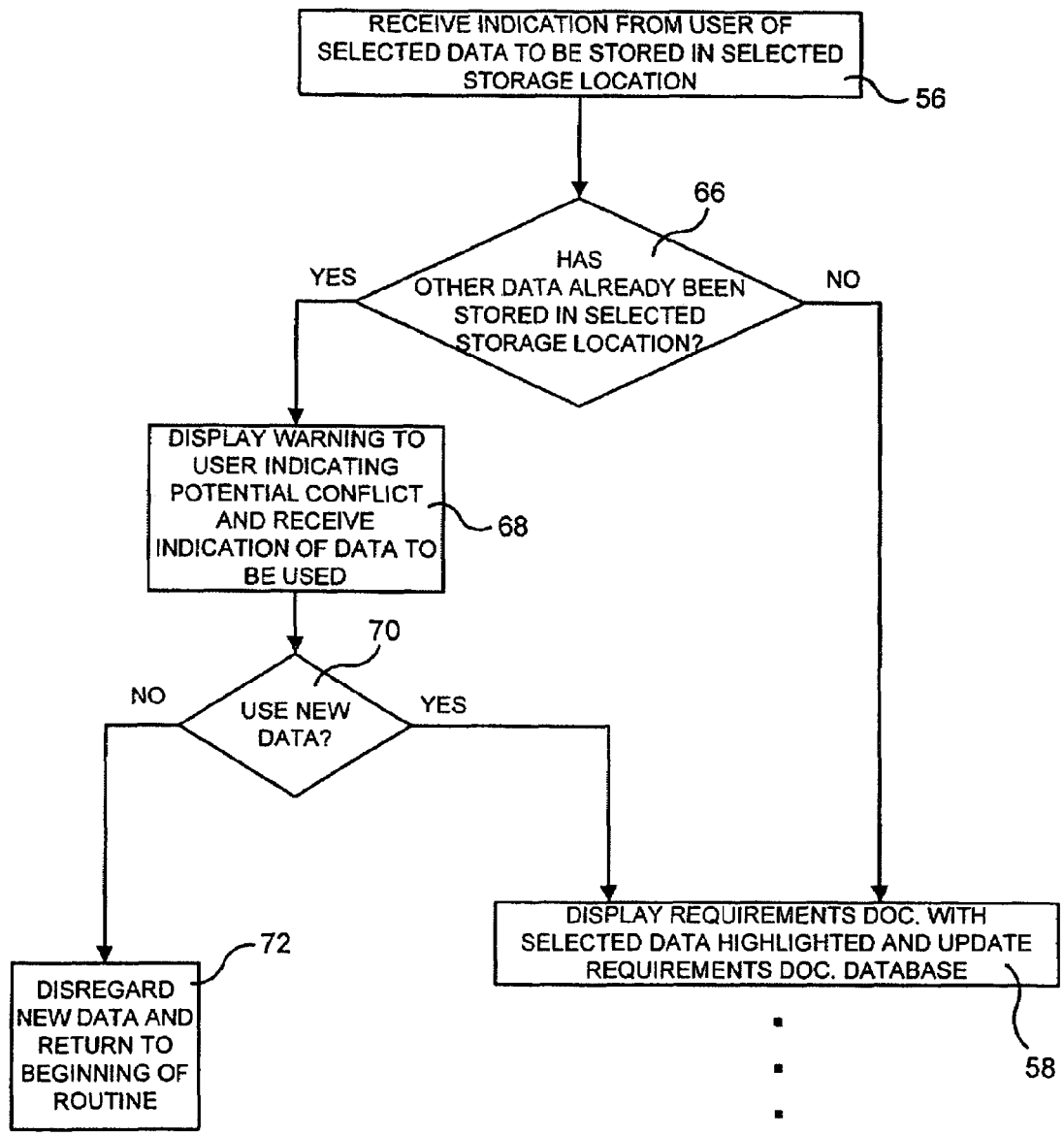
FIG. 3 is a flow diagram illustrating in more detail a portion of the method of operation shown in FIG. 2.

Referring now to FIG. 3, it is shown how system 10 may receive the indication from the user of the selected storage location. More specifically, if a desired storage location is in the list displayed to the user (shown at 50), the software receives an indication from the user of a selected storage location selected from the list, as shown at block 52. If a desired storage location is not in the list displayed to the user (shown at 50), the software receives an indication from the user of a selected storage location input by the user, as shown at block 54. For example, the user may create a new item by selecting the desired storage location from a checklist tree view (as indicated by reference character 64 in FIG. 6), or by entering search terms or keywords (as indicated by reference character 65 in FIG. 7).

Figure 8:
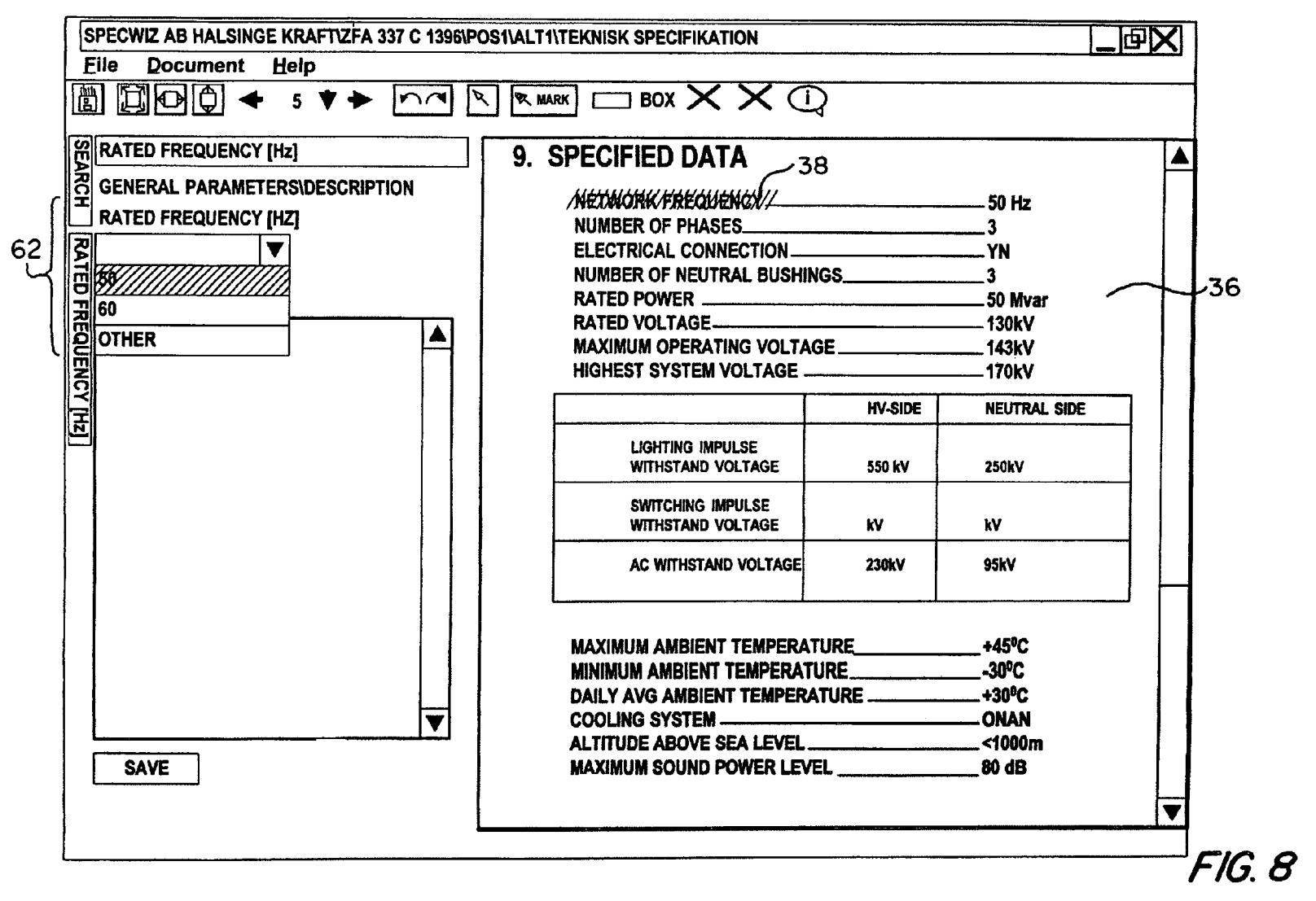

After the software receives the indication from the user of a selected storage location, the software receives an indication from the user of data selected by the user in the requirements document to be stored in the selected storage location, as shown at block 56. The data may be selected from the requirements document itself using a selection tool as described above, or may be selected from a drop-down list (as indicated by reference numeral 62 in FIG. 8) or the like. At block 58, the software displays the requirements document to the user with the selected data shown in a manner visually distinctive from unselected portions of the displayed requirements document, and updates the requirements document stored on the requirements document database to reflect the data selected by the user in the requirements document. The selected data may be shown in a manner visually distinctive from unselected portions, for example, with a coloured transparent rectangle (similar to the way text may be highlighted using a marker), by displaying selected data in a bolded, italicized, underlined, or otherwise visually distinctive font as compared to unselected portions, by displaying selected data in a different colour than unselected portions, etc.

Figure 4:
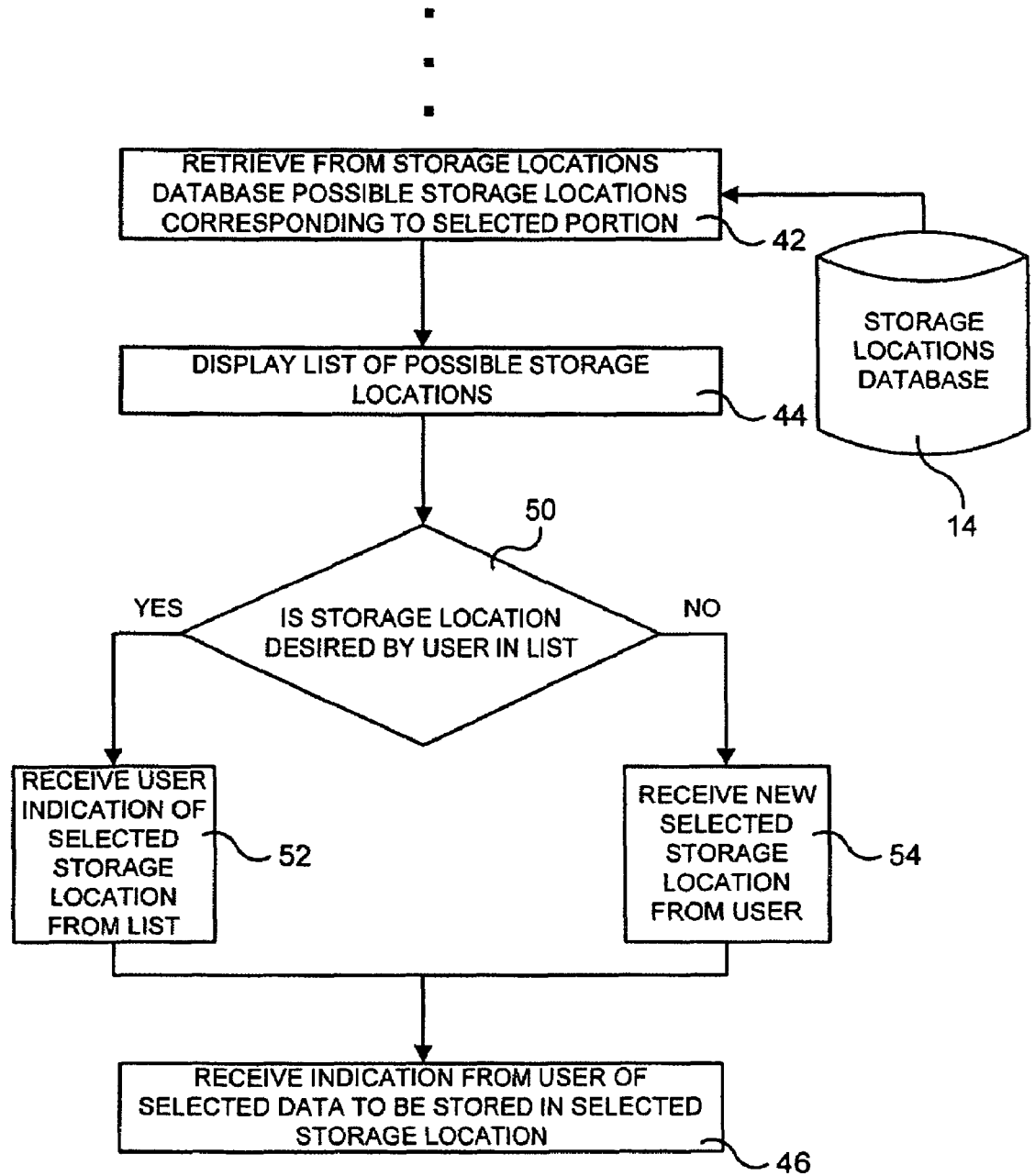
FIG. 4 is a flow diagram illustrating in more detail another portion of the method of operation shown in FIG. 2.

Referring now to FIG. 4, it is shown how system 10 may process the indication from the user of data selected by the user in the requirements document. The software, at block 66, determines whether data has previously been stored in the selected storage location. If no data has been previously stored in the selected storage location, the software continues on to block 58 where it displays the requirements document to the user with the selected data shown in a manner visually distinctive from unselected portions of the displayed requirements document, and updates the requirements document stored on the requirements document database to reflect the data selected by the user in the requirements document. If data has been previously stored in the selected storage location, the software displays a warning to the user indicating a potential conflict and receives an indication from the user whether to use the previously entered data or the currently entered data (as shown at block 68). If the indication received from the user reflects a desire of the user to use the previously entered (i.e., the old) data (shown at 70), the software, as shown at block 72 disregards the newly entered data and returns to block 30, wherein the requirements document is displayed. If the indication received from the user reflects a desire of the user to use the newly entered data (shown at 70), the software continues on to block 58 where it displays the requirements document to the user with the selected data shown in a manner visually distinctive from unselected portions of the displayed requirements document, and updates the requirements document stored on the requirements document database to reflect the data selected by the user in the requirements document.

If the selected data is selected directly from the requirements document (rather than from a drop-down list, for example), and requirements document is not in a text based format, such as if it is in portable document format (PDF) format, the software interprets the selected data of the requirements document using optical character recognition or like technology so that the selected data is converted into text format, as shown at block 60. The software then stores the selected data in the selected storage location in the processed specification stored on the processed specification database 22, as shown at block 74.

It may be desirable to be able to link portions of the requirements document with selected data, for example, in order to facilitate the location of the selected data in the requirements document, or to facilitate the location of some other portion of the requirements document which may be somehow germane to the selected data. In order to achieve this, the software may receive an indication from the user of a portion of the requirements document desired to be linked to the data selected by the user in the requirements document, as shown at block 76. The software then, as shown at block 78, stores, in the processed specification stored on processed specifications database 22, a link to the portion of the requirements document desired to be linked. The software may also, as shown at block 80, display the requirements document to the user with the portion of the requirements document desired to be linked shown in a manner visually distinctive from unlinked portions of the displayed requirements document in a manner similar to that discussed above.

Referring now to FIG. 9, it is shown how a selected portion 38' of requirements document 36 may be linked to selected data stored in the processed specification. In the example shown, the user has selected "Vibration" as the storage location, and has selected "Yes" as the data to be stored in the selected location. The user has also chosen to link the selected portion 38' of the requirements document 36 with the selected data, as shown at 82, in order to help illustrate how the user interpreted the selected portion 38' of the requirements document 36 in order to arrive at the selected location and the selected data.

Figure 10:
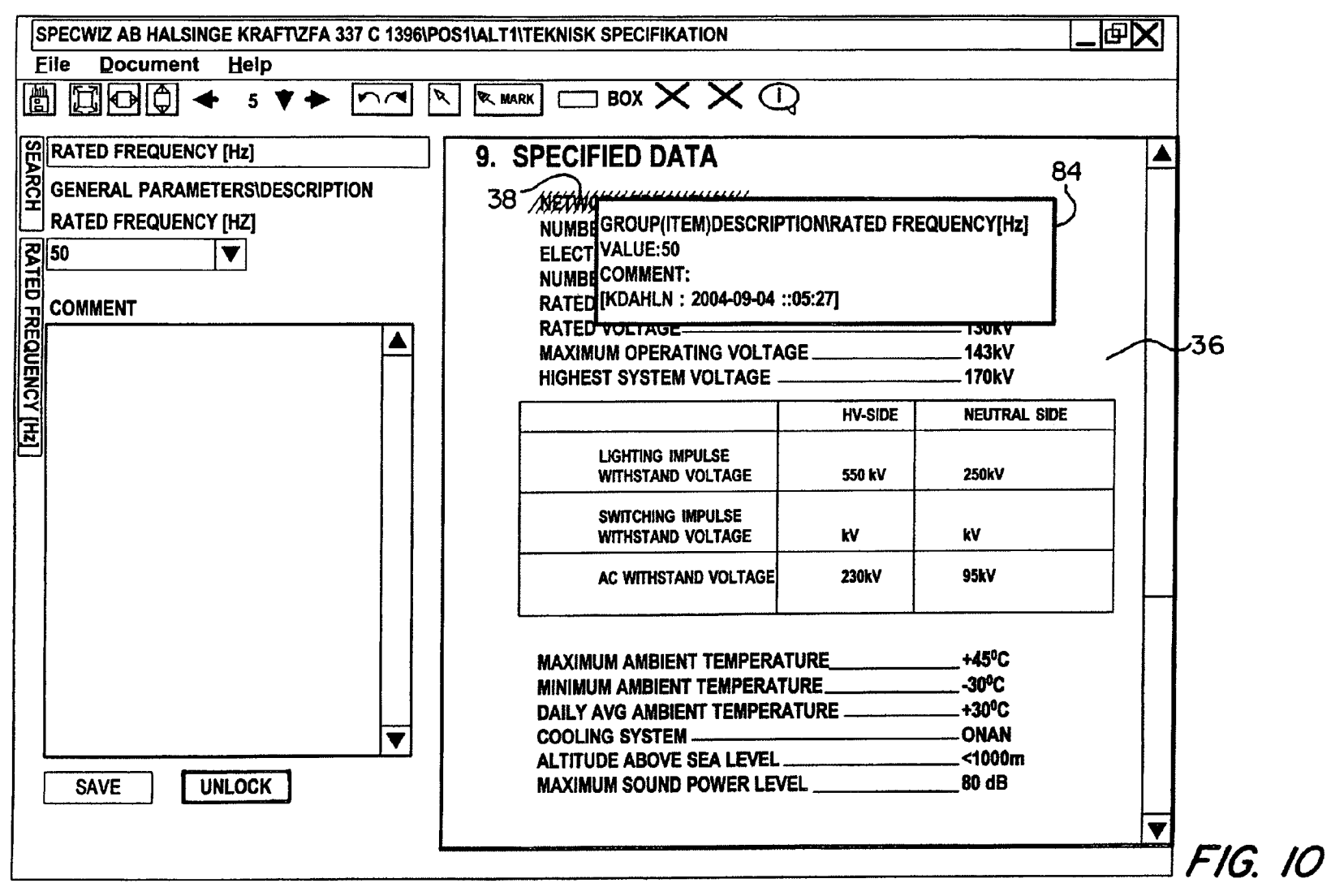

A user may desire to view the selected storage location, the selected data, and any linked portion of the requirements document 36 associated with a selected portion 38 of the requirements document 36. Referring now to FIG. 10, system 10 may allow the user to achieve this by displaying a pop-up box 84 or the like when the user moves a selection tool over the selected portion 38. The pop-up box 84 may also display additional information concerning the selection, such as the user who entered the selection, the time/date of such entry, etc. System 10 may obtain all necessary information from the requirements document stored on requirements documents database 18 and/or from the processed specification stored on processed specifications database 22.

Figure 11:
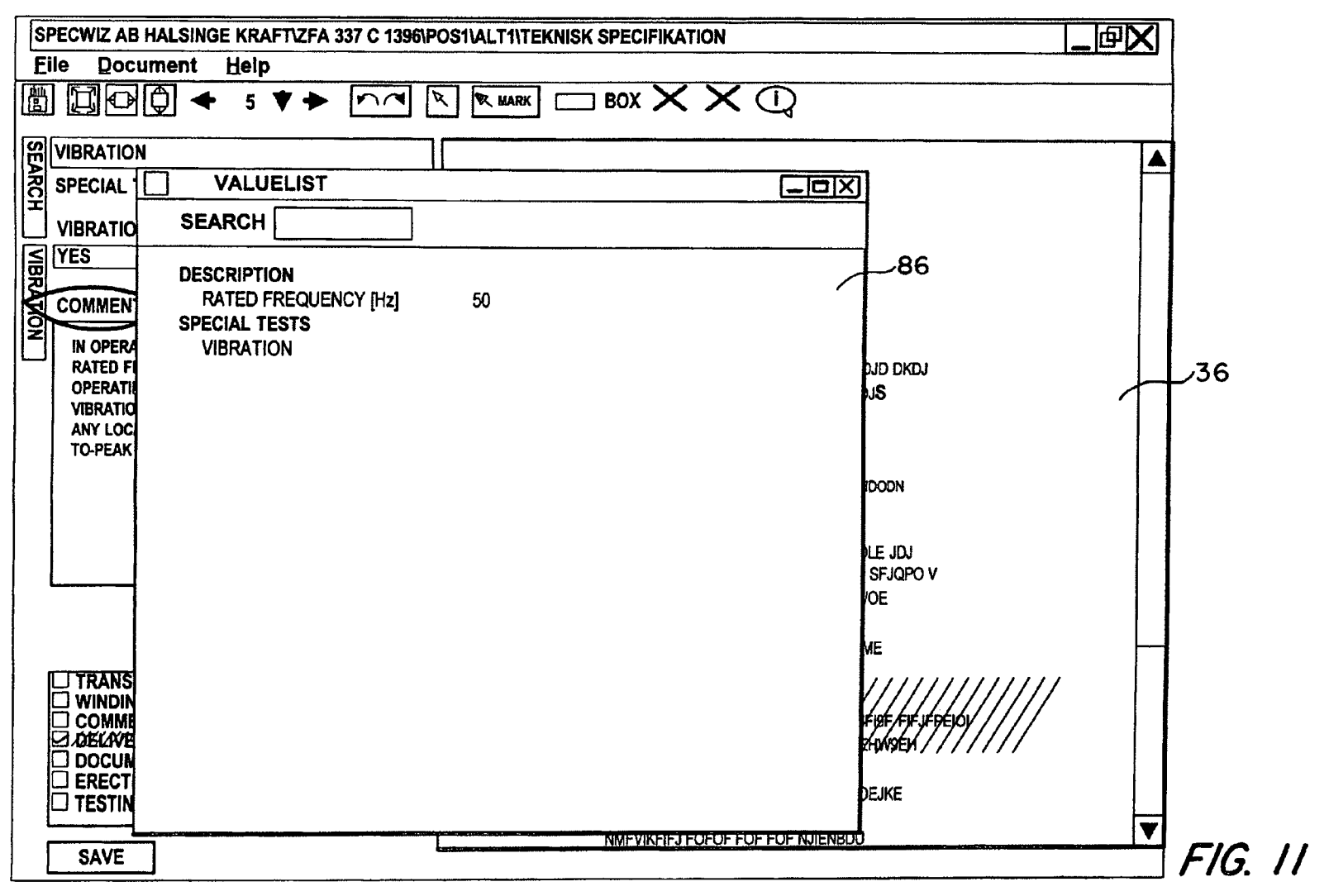

A user may also desire to view a list of all selections in the requirements document read to date. Referring to FIG. 11, system 10 may display such a list 86 upon receipt of an instruction from the user. List 86 may be helpful to user so that he/she can more easily determine what and how many further selections need to be read. Referring now to FIG. 12, system 10 may also simultaneously display both the requirements document 36 and the processed specification 88 (such as by way of a design program using the processed specification an in input) in order to allow the user to better see how the two correlate.

In view of the above, it should be understood that the present invention is a tool to read customer specification data and store both the interpretation of the read content in a database and the location in the specification of where it was read. The user interface displays a scanned copy of the requirement specification and the user marks data to be retrieved as if he or she was working with a paper document and a marking pen. Several users can work in parallel in the same document. The tool shortens the time required to read a specification (for example, by decreasing the likelihood of duplication of effort), and also increases the quality in capturing the customer requirements by providing the following benefits, among others:

- A marked section of the document has a link to the database where the interpreted value is stored. Moving the mouse over a marked section displays information about how the data was interpreted, where it was stored, who read the data and when it was read.
- The program makes an interpretation of the marked text and suggest a location in the database where to store the value.
- Data is stored in a database when it has been interpreted. Designer programs fetch the data directly from this database.
- Several users can work in parallel in the same document, and will see sections already marked and read by other users.
- Data that is not predefined in the database is saved under a new name in the database. The data will show up as a deviation until a user marks it as solved.
- At any time the user can obtain a complete list of requirements that have been read in all documents being part of a specification. Each item in the list has a link to the section that was marked when the data was read. By clicking on an item, the correct page with the marked text is displayed.
- Common parts of a specification that have been read once can be reused. A reused document enters all data for a new quotation into the database. Modifications or additions are made after they are saved for the new quotation only.

In view of the above, it should also be understood that the present invention has the following desirable attributes, among others:

It is only required that the specification be read once.

The specification is read from a scanned document or PDF.
The method to capture data simulates working with a marker pen.
Information about how data was read and interpreted is stored in a database.
The data collection follows the sequence of the written specification, independent of the sequence of check lists or input panels in design programs.
Data that has been read earlier (for other quotations) will be re-used.
Data read is accessible in design programs or other tools.
Several users are able to work with different parts of a specification at the same time.
There is a possibility to go back and check how a specific data entry was read, interpreted and stored, and by whom.
There is a possibility to obtain information about the source (where it was read) for all data in the checklist.
There is a check that all data that is required for the configuration has been read.
There is a check that duplicate and conflicting requirements are not entered.
It is possible to create written documents as output result from the database.

The present invention, therefore, provides a system and method for facilitating the creation, based on requirements documents, of design specifications that may be used as input data in design programs, which is streamlined and efficient from a time standpoint, which is accurate and not prone to errors, which allows for the verification of where in the requirements document a requirement was read and how it was interpreted, which facilitates entry of requirements found in the requirements document into the design specifications, which reduces the likelihood of duplication of effort, and which facilitates the determination of what sections of the requirements documents have been read and what sections still need to be read.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for facilitating the creation of design specifications, said system comprising:
   a specification creation computer;
   software executing on said specification creation computer which displays to a user a requirements document;
   software executing on said specification creation computer which receives an indication from the user of a selected portion of the requirements document;
   a storage locations database having stored thereon data indicative of a plurality of storage locations in a processed specification into which data may be entered;
   software executing on said specification creation computer which, based at least in part upon the indication from the user of the selected portion of the requirements document, retrieves from the storage locations database a list of possible storage locations corresponding to the selected portion of the requirements document;
   software executing on said specification creation computer which displays to the user the list of possible storage locations corresponding to the selected portion of the requirements document;
   software executing on said specification creation computer which receives an indication from the user of a selected storage location;
   software executing on said specification creation computer which receives an indication from the user of data selected by the user in the requirements document to be stored in the selected storage location; and
   software executing on said specification creation computer which stores the selected data in the selected storage location in the processed specification.

2. The system of claim 1 wherein the requirements document is stored on and retrieved from a requirements document database.

3. The system of claim 1 further comprising a requirements document capture computer/device for converting a requirements document from a printed document to a digital format.

4. The system of claim 1 wherein said software executing on said specification creation computer which receives an indication from a user of a selected portion of the requirements document further comprises software executing on said specification creation computer which displays the requirements document to the user with the selected portion shown in a manner visually distinctive from unselected portions of the displayed requirements document.

5. The system of claim 1 wherein the requirements document is stored on and retrieved from a requirements document database, and wherein said software executing on said specification creation computer which receives an indication from a user of a selected portion of the requirements document further comprises software executing on said specification creation computer which updates the requirements document stored on the requirements document database to reflect the portion of the requirements document selected by the user.

6. The system of claim 1 further comprising software executing on said specification creation computer which, before the list of possible storage locations corresponding to the selected portion of the requirements document is retrieved from the storage locations database, interprets the selected portion of the requirements document using optical character recognition.

7. The system of claim 1 wherein said software executing on said specification creation computer which receives an indication from the user of a selected storage location comprises software executing on said specification creation computer which, if a desired storage location is in the list displayed to the user, receives an indication from the user of a selected storage location selected from the list, and if a desired storage location is not in the list displayed to the user, receives an indication from the user of a selected storage location input by the user.

8. The system of claim 1 wherein said software executing on said specification creation computer which receives an indication from the user of data selected by the user in the requirements document desired to be stored in the selected storage location further comprises software executing on said specification creation computer which displays the requirements document to the user with the selected data shown in a manner visually distinctive from unselected portions of the displayed requirements document.

9. The system of claim 1 wherein the requirements document is stored on and retrieved from a requirements document database, and wherein said software executing on said specification creation computer which receives an indication from the user of data selected by the user in the requirements document desired to be stored in the selected storage location further comprises software executing on said specification creation computer which updates the requirements document stored on the requirements document database to reflect data selected by the user in the requirements document desired to be stored in the selected storage location.

10. The system of claim 1 wherein said software executing on said specification creation computer which receives an indication from the user of data selected by the user in the requirements document desired to be stored in the selected storage location further comprises software executing on said specification creation computer which determines whether data has previously been stored in the selected storage location, and, if data has been previously stored in the selected storage location, displays a warning to the user indicating a potential conflict and receives an indication from the user whether to use the previously entered data or the currently entered data.

11. The system of claim 1 wherein the processed specification is stored on a processed specifications database.

12. The system of claim 1 further comprising software executing on said specification creation computer which, before the selected data is stored in the selected storage location in the processed specification, interprets the data selected by the user in the requirements document using optical character recognition.

13. The system of claim 1 further comprising software executing on said specification creation computer which receives an indication from the user of a portion of the requirements document desired to be linked to the data selected by the user in the requirements document, and which stores, in the processed specification, a link to the portion of the requirements document desired to be linked.

14. The system of claim 13 wherein said software executing on said specification creation computer which receives an indication from the user of a portion of the requirements document desired to be linked to the data selected by the user in the requirements document further comprises software executing on said specification creation computer which displays the requirements document to the user with the portion of the requirements document desired to be linked shown in a manner visually distinctive from unlinked portions of the displayed requirements document.

15. The system of claim 1 wherein said specification creation computer comprises a plurality of specification creation computers, and wherein said plurality of specification creation computers are capable of being used by a plurality of users simultaneously in order to simultaneously process the requirements document into the processed specification.

16. The system of claim 1 further comprising a designer computer having software executing thereon for creating a design specification based at least in part upon the processed specification.

17. The system of claim 16 wherein the specification creation computer and the designer computer comprise the same computer system.

18. A system for facilitating the creation of design specifications, said system comprising:

a specification creation computer;

software executing on said specification creation computer which displays to a user a requirements document;

software executing on said specification creation computer which receives an indication from the user of a selected portion of the requirements document, which displays the requirements document to the user with the selected portion shown in a manner visually distinctive from unselected portions of the displayed requirements document;

software executing on said specification creation computer which interprets the selected portion of the requirements document using optical character recognition;

a storage locations database having stored thereon data indicative of a plurality of storage locations in a processed specification into which data may be entered;

software executing on said specification creation computer which, based at least in part upon the indication from the user of the selected portion of the requirements document, retrieves from the storage locations database a list of possible storage locations corresponding to the selected portion of the requirements document;

software executing on said specification creation computer which displays to the user the list of possible storage locations corresponding to the selected portion of the requirements document;

software executing on said specification creation computer which, if a desired storage location is in the list displayed to the user, receives an indication from the user of a selected storage location selected from the list, and if a desired storage location is not in the list displayed to the user, receives an indication from the user of a selected storage location input by the user;

software executing on said specification creation computer which receives an indication from the user of data selected by the user in the requirements document to be stored in the selected storage location, and which displays the requirements document to the user with the selected data shown in a manner visually distinctive from unselected portions of the displayed requirements document;

software executing on said specification creation computer which interprets the data selected by the user in the requirements document using optical character recognition; and software executing on said specification creation computer which determines whether data has previously been stored in the selected storage location, and, if data has been previously stored in the selected storage location, displays a warning to the user indicating a potential conflict and receives an indication from the user whether to use the previously entered data or the currently entered data, and which stores the selected data in the selected storage location in the processed specification if the indication is indicative of a desire to use the currently entered data.

19. The system of claim 18 wherein the requirements document is stored on and retrieved from a requirements document database.

20. The system of claim 19 further comprising a requirements document capture computer/device for converting a requirements document from a printed document to a digital format and for storing the requirements document, in the digital format, on the requirements document database.

21. The system of claim 19 wherein said software executing on said specification creation computer which receives an indication from a user of a selected portion of the requirements document further comprises software executing on said specification creation computer which updates the requirements document stored on the requirements document database to reflect the portion of the requirements document selected by the user.

22. The system of claim 19 wherein said software executing on said specification creation computer which receives an indication from the user of data selected by the user in the requirements document desired to be stored in the selected storage location further comprises software executing on said specification creation computer which updates the requirements document stored on the requirements document database to reflect data selected by the user in the requirements document desired to be stored in the selected storage location.

23. The system of claim 18 wherein the processed specification is stored on a processed specifications database.

24. The system of claim 18 further comprising software executing on said specification creation computer which receives an indication from the user of a portion of the requirements document desired to be linked to the data selected by the user in the requirements document, and which stores, in the processed specification, a link to the portion of the requirements document desired to be linked.

25. The system of claim 24 wherein said software executing on said specification creation computer which receives an indication from the user of a portion of the requirements document desired to be linked to the data selected by the user in the requirements document further comprises software executing on said specification creation computer which displays the requirements document to the user with the portion of the requirements document desired to be linked shown in a manner visually distinctive from unlinked portions of the displayed requirements document.

26. The system of claim 18 wherein said specification creation computer comprises a plurality of specification creation computers, and wherein said plurality of specification creation computers are capable of being used by a plurality of users simultaneously in order to simultaneously process the requirements document into the processed specification.

27. The system of claim 18 further comprising a designer computer having software executing thereon for creating a design specification based at least in part upon the processed specification.

28. The system of claim 27 wherein the specification creation computer and the designer computer comprise the same computer system.

29. A method for facilitating the creation of design specifications, said method comprising the steps of:
displaying to a user a requirements document;
receiving an indication from the user of a selected portion of the requirements document;
retrieving from a storage locations database having stored thereon data indicative of a plurality of storage locations in a processed specification into which data may be entered, based at least in part upon the indication from the user of the selected portion of the requirements document, a list of possible storage locations corresponding to the selected portion of the requirements document;
displaying to the user the list of possible storage locations corresponding to the selected portion of the requirements document;
receiving an indication from the user of a selected storage location;
receiving an indication from the user of data selected by the user in the requirements document to be stored in the selected storage location; and
storing the selected data in the selected storage location in the processed specification.

30. The method of claim 29 further comprising the step of, before said step of displaying to a user a requirements document, storing the requirements document on and retrieving the requirements document from a requirements document database.

31. The method of claim 30 wherein said step of receiving an indication from a user of a selected portion of the requirements document further comprises the step of updating the requirements document stored on the requirements document database to reflect the portion of the requirements document selected by the user.

32. The method of claim 30 wherein said step of receiving an indication from the user of data selected by the user in the requirements document desired to be stored in the selected storage location further comprises the step of updating the requirements document stored on the requirements document database to reflect data selected by the user in the requirements document desired to be stored in the selected storage location.

33. The method of claim 29 further comprising the step of converting a requirements document from a printed document to a digital format.

34. The method of claim 29 wherein said step of receiving an indication from a user of a selected portion of the requirements document further comprises the step of displaying the requirements document to the user with the selected portion shown in a manner visually distinctive from unselected portions of the displayed requirements document.

35. The method of claim 29 further comprising the step of, before the list of possible storage locations corresponding to the selected portion of the requirements document is retrieved from the storage locations database, interpreting the selected portion of the requirements document using optical character recognition.

36. The method of claim 29 wherein said step of retrieving a list of possible storage locations comprises the step of, if a desired storage location is in the list displayed to the user, receiving an indication from the user of a selected storage location selected from the list, and if a desired storage location is not in the list displayed to the user, receiving an indication from the user of a selected storage location input by the user.

37. The method of claim 29 wherein said step of receiving an indication from the user of data selected by the user in the requirements document desired to be stored in the selected storage location further comprises the step of displaying the requirements document to the user with the selected data shown in a manner visually distinctive from unselected portions of the displayed requirements document.

38. The method of claim 29 wherein said step of receiving an indication from the user of data selected by the user in the requirements document desired to be stored in the selected storage location further comprises the step of determining whether data has previously been stored in the selected storage location, and, if data has been previously stored in the selected storage location, displaying a warning to the user indicating a potential conflict and receiving an indication from the user whether to use the previously entered data or the currently entered data.

39. The method of claim 29 wherein the processed specification is stored on a processed specifications database.

40. The method of claim 29 further comprising the step of, before the selected data is stored in the selected storage location in the processed specification, interpreting the data selected by the user in the requirements document using optical character recognition.

41. The method of claim 29 further comprising the step of receiving an indication from the user of a portion of the requirements document desired to be linked to the data selected by the user in the requirements document, and storing, in the processed specification, a link to the portion of the requirements document desired to be linked.

42. The method of claim 41 wherein said step of receiving an indication from the user of a portion of the requirements document desired to be linked to the data selected by the user in the requirements document further comprises the step of displaying the requirements document to the user with the portion of the requirements document desired to be linked shown in a manner visually distinctive from unlinked portions of the displayed requirements document.

43. The method of claim 29 wherein the requirements document is capable of being processed into the processed specification by a plurality of users simultaneously.

44. The method of claim 29 further comprising the step of creating a design specification based at least in part upon the processed specification.

* * * * *